United States Patent [19]

Clay et al.

[11] Patent Number: 4,474,705
[45] Date of Patent: Oct. 2, 1984

[54] PROCESS FOR THE PREPARATION OF ORGANOPHILIC CLAYS

[75] Inventors: Hughie M. Clay, Independence; Michael Frozzitta; Alan L. Brotherton, both of Coffeyville, all of Kans.

[73] Assignee: The Sherwin-Williams Company, Cleveland, Ohio

[21] Appl. No.: 413,209

[22] Filed: Aug. 30, 1982

Related U.S. Application Data

[63] Continuation-in-part of Ser. No. 331,707, Dec. 17, 1981, abandoned.

[51] Int. Cl.$^3$ ............................................. C07F 5/06
[52] U.S. Cl. ................................................ 260/448 C
[58] Field of Search ................................... 260/448 C

[56] References Cited

U.S. PATENT DOCUMENTS

| | | | |
|---|---|---|---|
| 2,531,427 | 11/1950 | Hauser | 260/448 C |
| 2,531,812 | 11/1950 | Hauser | 252/815 |
| 2,531,825 | 3/1950 | Peterson | 260/448 C X |
| 2,767,177 | 10/1956 | Erickson | 260/448 C X |
| 2,859,234 | 11/1958 | Clem | 260/448 C |
| 2,951,087 | 8/1960 | Hauser et al. | 260/448 C |
| 2,966,506 | 12/1980 | Jordan | 260/448 C |
| 2,971,922 | 2/1961 | Clem | 252/316 |
| 3,012,050 | 12/1961 | Fox et al. | 260/448 C |
| 3,350,429 | 10/1967 | Hasegawa et al. | 260/448 C X |
| 4,105,578 | 8/1978 | Finlayson et al. | 260/448 C X |
| 4,193,806 | 3/1980 | Finlayson | 106/20 |
| 4,287,086 | 9/1981 | Finlayson et al. | 260/448 C X |
| 4,402,881 | 9/1983 | Alther | 260/448 C |

Primary Examiner—Helen M. S. Sneed
Attorney, Agent, or Firm—James V. Tura; Robert E. McDonald

[57] ABSTRACT

This invention is directed to a process for the production of organophilic clays and more particularly to a dry process for the production of organophilic clays useful for thickening various fluids including mineral oils, drilling fluids, paints, and lubricants such as mineral oils. The process comprises thoroughly mixing at least one organic ammonium salt with specific amounts of substantially water-free clays and vigorously blending the organic ammonium salt and the dry clay at temperatures at least above the melting point of the organic ammonium salt to drive-off any liquids resulting from the dry reaction.

2 Claims, No Drawings

PROCESS FOR THE PREPARATION OF ORGANOPHILIC CLAYS

This application is a continuation-in-part of application, Ser. No. 331,707 filed on Dec. 17, 1981, now abandoned.

This invention relates to the preparation of organophilic clays useful as thickeners for various fluids and more particularly to a dry process for the manufacture of organophilic clays useful as thixotropic viscosifying agents in mineral oils and particularly oil-based drilling muds or fluids, paints, lubricants and the like.

BACKGROUND

Organophilic clays have been known as jelling or thickening agents for various fluids such as mineral oils and are particularly useful for thickening oils in the preparation of lubricants such as grease and the like. More specifically, U.S. Pat. Nos. 2,531,427; 2,531,812 and 2,966,506 describe clays that have been modified with organophilic compounds as thickener for organic fluids. Generally, the process for manufacturing organophilic clays includes adding an onium base, e.g. ammonium, phosphonium, sulfonium, arsonium, stibonium, oxonium, etc. to water slurries of swellable clays causing the onium base to react with the clay to form the organophilic clay product.

In earth boring operations, the use of rotary drilling equipment requires the addition of drilling fluids or muds. These drilling fluids are either made from clays obtainable at the well site or by the addition of hydrophillic colloids of which aminemodified bentonite is the most common. In addition to the organophilic clays, certain other additives including polymers have been used as thickeners for fluids in the drilling of oil wells. The oil-based drilling muds may be employed where the external or continuous phase of the mud is oil instead of water. The oil-based drilling fluids are useful particularly where drilling is in oil or gas bearing stratum because the oil-based muds will not "drown out" the oil or gas as in the case of a water-based drilling fluid. It is also advantageous to employ an oil-based fluid in drilling through shale formations which are subject to hydration by water. The external phase of the oil-based fluids may include various oils such as petroleum or crude oil distillates, coal tar distillate or residue and other oils such kerosenes, fuel oil, diesel oils and the like.

Organophilic clays made by the aqueous slurry process are useful as thickeners in paints, as well as in mineral oils for the preparation of greases and the like. However, the performance parameters needed for the preparation of these compositions are more critical and require a higher degree of purity of material. The aqueous slurry process provides a grit-free, salt-free product due to the centerfusing, washing and subsequent drying utilized in the processes. The purity of the organophilic clays are less critical, however, where the modified clays are to be used in drilling muds.

Further, the water slurry process also requires dispersing and hydrating the treated clay in deionized or salt free water. The dispersed clay must be stored in order to maintain its hydration and centerfuged to remove any grit remaining in the clay.

The organophilic compound, e.g. quaternary ammonium salts are added to the aqueous dispersion of clay at temperatures ranging from 100° F. to 120° F. The exact quantities of clay and quaternary ammonium salt needed for reaction must be calculated in order to obtain a completely modified clay product. Finally, it is essential that when using the aqueous process the product must be filtered in a filter cake which may contain up to about 80% water, and dried in a stream of warm air. At this point the modified clay may be ground to the desired commercial mesh size and used for a variety of purposes.

SUMMARY

The non-aqueous or dry process of this invention is unique in that it provides for reacting the substantially dry colloidal clay with at least one organic ammonium salt, in the dry state, to produce an organophilic clay or modified clay useful as a thickener for drilling muds and particularly muds which comprise oils. In accordance with this invention, the process provides a substantially water-free method of producing organophilic clays and avoids all of the problems associated with utilizing large amounts of water in the aqueous slurry process. Specifically, the dry colloidal clay is charged to a blending apparatus or mixer and blended with about 15 to 55% by weight of the dry clay of at least one organic ammonium salt. The organic ammonium salt and clay are vigorously blended in the apparatus at increased temperatures, e.g. up to 60° C. causing the clay to react with the quaternary ammonium salt, by ion exchange, resulting in an organic modified clay product. The modified clay, e.g. amine modified, obtained from this dry process may be subsequently washed in water to remove any salts and heated to obtain a substantially dry organophilic or amine modified clay. The product can be ground to a commercial size, e.g. approximately 200 mesh and utilized in oil-based drilling fluids.

It is an object of this invention to provide a process wherein colloidal clay, substantially free of water, is produced by reacting dry clay with an organic ammonium salt in the dry state to obtain a substantially water-free modified clay. The dry process avoid the problems and cost inherent in filtering and drying clays obtained from a water slurry process. It is another object of invention to eliminate a number of procedures needed heretofore and obtain organophilic clays by reacting the clay with an organic compound without the presence of water as required heretofore.

DETAILED DESCRIPTION OF THE INVENTION

Clays useful in the practice of this invention are clays that have a substantial base-exchange capacity and whose cations are relatively easily replaced. A particularly desirable clay, from which organophilic clay may be prepared, is the Wyoming variety of swelling bentonites. These clays exhibit a base exchange capacity ranging from about 60 to 100 milliequivalents (meq) of exchangeable base per 100 grams of clay. These base exchange values were determined by the ammonium acetate method. A typical naturally occuring Wyoming bentonite may have approximately 50% of its base exchange capacity satisfied by sodium ions with the remainder of its exchangeable ions being calcium, magnesium and potassium with the major portion being calcium. Because sodium ions commonly constitute a sizeable fraction of the exchangeable metallic ions in a naturally occuring bentonite clay, it has been a wide-spread practice to refer to such clays as sodium bentonite even though a substantial portion of the exchangeable ions, perhaps 50% or more, are ions other than sodium. In addition to the clays mentioned above, other clays such as attapulgite, nectorite, nontrionite, illite, saponite, zeolite and fuller's earth are useful in the practice of this invention. All of these clays are characterized by an unbalanced crystal lattice and believed to have negative charges which are normally neutralized in their natural state by inorganic metal ions which, to varying degrees, are capable of being replaced by other inorganic ions or organic radicals.

Organic ammonium salts which readily undergo base exchange reaction with the clays include, for example, the primary, secondary, tertiary and quaternary ammonium salts. The preferred ammonium salts contain at least one carbon chain of 12 or more carbon atoms. Thus, the cation of the salt used to react with the clay may include radicals such as dodecylammonium, octadecylammonium, didodecylammonium, dihexadecylammonium, tetradecylbenzylammonium, methyldioctadecylammonium, dibenzyldodecylammonium, dimethyldioctadecylammonium, methylbenzyldihexadecylammonium, and the like. One particularly useful quaternary ammonium salt which is common in many commercial organophilic clay formulations is dimethyl dihydrogenated tallow ammonium chloride.

The process of this invention requires vigorous, intimate contact of the reactants i.e. the clay and the ammonium salt to achieve a reasonably complete reaction product. The reactants are mixed and blended at an elevated temperature, e.g. temperatures ranging up to 60° C., so that the ammonium salt is in liquid form and the mixing of the reactants must be rigorous. It has been found, for example, that on a laboratory scale a useful product can be obtained by using a mortar and pestal. On an industrial scale, any of several blending apparatus may be used such as a blender, e.g. a ribbon blender or extruder, etc. to achieve an acceptable product. The preferred blending apparatus which achieves proper intimate contact with a minimum amount of processing time and results in an easily grindable, dry product is a muller. A muller works substantially on the principal of a mortar and pestal in which rotating surfaces crush and squeeze the product against the walls and/or floor of the muller reaction vessel. There is some heating of the reaction mixture and product due to friction and compression within the system which is not detrimental to the processing of the clay of this invention. In fact, the heat assists in the removal of entrained water and solvents which may be present in both the ammonium salt and the clay as they are added prior to processing. In accordance with a further aspect of the invention, the reaction chamber of the reactor may include an air flow system to assist in the removal of volatile fluids.

The following examples illustrate the preparation and use of organophilic clay materials in accordance with this invention. It is understood that these examples are for illustration and should not be considered as a limitation upon the materials or process steps which may be incorporated as part of the invention.

EXAMPLE I

About one hundred pounds of Wyoming bentonite is charged to the reaction chamber of a muller and mulling and agitation is begun. To the rotating mixture, 40 to 70 pounds of a quaternary ammonium chloride, i.e. dimethyl dihydrogenated tallow ammonium chloride is added at a temperature of about 60° C. (the temperature being sufficient to melt the quaternary ammonium salt) over a period of about 5–30 minutes. The reaction mixture is stirred and mulled for an additional 10 to 30 minutes following the addition of the ammonium salt. The mixture initially becomes lumpy and the lumps are gradually broken up and reduced in size during the mulling process. The material is then removed from the reaction vessel, in a dry state, and ground to commercial size (200 mesh) for use in thickening oil-based drilling fluids.

EXAMPLE II

The organophilic clay made in accordance with the procedures set forth in Example I was compared in an oil-based drilling mud system with other, commercial organophilic clays made by prior art (water slurry) processes to determine the performance of the dry process material. Each of these materials was tested in a proprietary drilling fluid formulation known as the Aspha-Mul drilling fluid system. To formulate a 65/35 oil to water ratio drilling fluid and make 100 barrels of mud, fifty-six (56) barrels of diesel oil was added to a mixing tank. To the diesel oil was added ten pounds per barrel (ppb) of Aspha-Mull TM concentrate, five pounds per barrel EW-20 emulsifier, eight pounds per barrel MC-500 filtration control agent and ten pounds per barrel CaO. Thirty barrels of 10 lbs./gal. sodium chloride brine was then added to the circulating mixture and 147 sacks (100 lbs./sack) of barite weighting agent was then added to the fluid mixture. The organophilic clays to be tested were then added in the amount of about 2 ppb with the results of the testing, i.e. properties of the fluid shown in Table I.

TABLE I

|  | DRY PROCESS CLAY | Comp A | Comp B | Comp C | Comp D | Comp E |
|---|---|---|---|---|---|---|
| App. Vis. | 19 | 18.5 | 18.5 | 18.5 | 20.5 | 18 |
| 600 | 38 | 37 | 39 | 37 | 41 | 36 |
| 300 | 22 | 21 | 22 | 20 | 22 | 20 |
| PV | 16 | 16 | 17 | 17 | 19 | 16 |
| YP | 6 | 5 | 5 | 3 | 3 | 4 |
| Emul. Stab. | 236 | 190 | 159 | 144 | 384 | 82 |

In Table I, the "Dry Process Clay" material is the material of this invention and compositions A through E represent commercial, prior art materials. In Table I, the apparent viscosity (App. Vis.) is well within experimental limits as is the Fann viscosity at six hundred (600) and three hundred (300) rpm. The plastic viscosity (PV) and the yield point (YP) are all comparable, a yield point in the range of 4–8 being considered optimum. The emulsion stability (EMUL STAB) is a measure of the electrical resistance of the fluid, with a value of 200 or above being preferred. If the emulsion stability is low, the emulsion will break down and the fluid will lose its performance values. Finally, the high temperature, high pressure fluid loss (HTHP FL) was measured for each fluid, a low filtration rate being reflective of good performance of the organophilic clay. It can be seen from Table I that the organophilic clay of this invention falls well within the performance parameters of the prior art, wet slurry process materials.

EXAMPLE III

The dry organophilic clay product of Example I was washed thoroughly in water and filtered. The organophilic clay is hydrophobic and the clay filter cake comprise less than 30% water. The filter cake was dried and ground to produce a chloride free, paint grade organophilic clay at much less cost then prior art slurry processes in which up to 70–80% water must be removed.

To further illustrate the difference between the organophilic clays prepared by the dry process of this invention and the modified clays derived from aqueous systems, the following data were established. It is known that the crystal structure of most clays are composed of layers where each layer consists of firmly bonded network of Si-O tetrahedra and Al-O octahedra. The forces holding the layers are generally weak, therefore, cations, water and organic molecules can be introduced into the spacing between the layers. The layers may or may not be neutral depending on whether isomorphous substitution of atoms has taken place such as magnesium replacing aluminum, etc. The raw bentonite clays (Samples 1, 7 and 10 of Table II) are sodium montmorillonite which has an orthorhombic symmetry. The repeating unit (unit cell) of its crystal structure is defined by cell dimensions, a, b and c mutually perpendicular. Depending on the size of molecules absorbed on the interlayers, the unit cell dimension "c" varies drastically while the other two dimension "a" and "b" remain in tact. In terms of x-ray diffraction experiments, the positions of the basal reflections change accordingly, while the positions of the general reflections stay the same. The unit cell dimensions "a", "b" and "c" can be derived from the x-ray diffraction patterns of the clays.

By experimentation, x-ray diffraction analysis was run for each of the 11 samples set forth in Table II. In order to be positive with respect to identification and confirmation, a portion of each raw clay (samples 1, 7 and 10) was dried at 120° C. for two hours, another portion of each raw clay was wetted with glycerol. X-ray diffraction analysis was also run for these samples of raw clays. In order to measure the d-spacings accurately at very low angels, the (110) peak of sodium tartrate at $d=9.05$ A° was used as an internal standard. Comprehensive analysis of the x-ray diffraction patterns of all the clay samples indicates that the three raw clays (samples 1, 7 and 10) are essentially the same clean montmorillorite with very minor quartz contamination. The strong quartz reflection at $d=3.343$ A° was used as a calibration reference for instrumental error. The unit cell dimensions and other derived data are listed in the Table. It should be noted that the basal plane spacing "c" is the repeating distance between layers of the clay structure, the clearance space "delta" is the space between layers occupied by the intruding molecules, e.g. water, glycerol and dimethyl dihydrogenated tallow ammonium cations. The expansion "X" is the increase in space between layers relative to that of the starting raw clay.

TABLE II

| | X-RAY DATA ON ORGANOPHILIC CLAYS | | | | |
|---|---|---|---|---|---|
| | Unit Cell Data, A° | | | | |
| Clay Sample | a | b | c | t | X |
| 1. Raw clay, untreated bentonite, CG-SW from Federal Bentonite | 5.18 | 8.97 | 12.4 | 2.8 | 0 |
| 2. Organophilic clay, dry process, Humko Q9702C added | 5.18 | 8.97 | 35.3 | 25.7 | 22.9 |
| 3. Organophilic clay, dry process, washed to remove ions | 5.18 | 8.97 | 30.4 | 20.8 | 18.0 |
| 4. Organophilic clay, wet process, improved the hydration | 5.18 | 8.97 | 33.9 | 24.3 | 21.5 |
| 5. Organophilic clay, wet process, Southern Clay, Clayton Mud VG-02 | 5.18 | 8.97 | 29.4 | 19.8 | 17.0 |
| 6. Organophilic Clay, wet process, Accofloc 350 and Armak 2HT-75 | 5.18 | 8.97 | 29.4 | 19.8 | 17.0 |
| 7. Raw Clay, Untreated bentonite, Accofloc 350 from Am Colloid | 5.18 | 8.97 | 12.4 | 2.8 | 0 |
| 8. Organophilic Clay, dry process. National Lead's Geltone II | 5.18 | 8.97 | 35.3 | 25.7 | 22.9 |
| 9. Organophilic Clay, wet process, National Lead's Betonite 34 | 5.18 | 8.97 | 28.5 | 18.9 | 16.1 |
| 10. Raw Clay, untreated bentonite, Wyo Jel 1019 from Federal Bentonite | 5.18 | 8.97 | 12.4 | 2.8 | 0 |
| 11. Organophilic Clay, dry process, Humko Q972C and Wyo Jel 1019 | 5.18 | 8.97 | 32.7 | 23.1 | 20.3 |
| 12. Raw Clay #1, #7 & #10, dried at 120° C., 2 hrs. | 5.18 | 8.97 | 9.60 | 0 | −2.8 |
| 13. Raw Clay #1, #7 & #10, wetted with Glycerol | 5.18 | 8.97 | 18.0 | 8.4 | 5.6 |

It should be noted from the data in Table II that the starting raw clays (samples 1, 7 and 10) are typical sodium montmorillorites with a monomolecular sheet of water between layers in their crystal structure. The thickness of the layers is 12.4 A°. It contracts to 9.60 A° on dehydration and expands to 18.0 A° when wetted with glycerol, which is a typical behavior for sodium montmorillorite.

The dimensions of the unit cell (repeating unit of crystal structure) remained constant, $a=5.18$ A° and $b=8.97$ A° displaying the strong Si-O and Al-O bonds. However, the third dimension, "c" changes due to weak Van der Waal bond. The "c" dimension is a direct measure of layer separation (perpendicular distance between layers) which varies between 9.6 A° and 35.3 A° depending on the size of the molecules sandwiched between the layers namely:

c=9.6 for dried clay
c=12.4 for raw clay
c=18.0 for glycerol clay
c=28.5-35.3 for organophilic clays The layer separation in the organophilic clays obtained by the dry process (samples 2, 3, 4, 8 and 11: c is greater than 30 A°) appears to be slightly larger than that of the wet process (samples 5, 6 and 9: c is less than 30°) according to the data in the Table II.

In terms of crystal structure and layer separation, the organophilic clays made in accordance with this invention are equal or better than other organophilic clays obtained from aqueous reaction systems. More specifically the dimethyl dihydrogenated tallow ammonium cations, e.g. the chlorides, are successfully introduced into the crystal structure (between layers) and not just on the surface of the clay particles.

It can be seen that using the above process, a lubricating grade organophilic clay may also be produced by the process of this invention. This invention provides a dry process for the production of organophilic clay which eliminates many of the labor and cost intensive steps of prior art slurry processing to produce organophilic clay.

While the invention has been described in the more limited aspects of a preferred embodiment thereof, other embodiments have been suggested and still others will occur to those skilled in the art upon the reading and understanding of the foregoing specifications. It is intended that all such embodiments be included within the scope of the invention as limited only by the appended claims.

The invention claimed is:

1. A process for manufacturing an organophilic clay under dry conditions which comprises reacting dry bentonite with dimethyl dihydrogenated tallow ammonium chloride by mixing the bentonite with about 15 to 55% by weight of the clay of the ammonium chloride at a temperature above 60° C. for a period sufficient to obtain an organophilic bentonite clay and subsequently removing any liquids resulting from the reaction.

2. The organophilic bentonite clay obtained by the process of claim 1.

* * * * *